March 12, 1963   R. N. CONRATH   3,080,661
TYPEWRITER VISUAL AID SYSTEM
Filed Dec. 30, 1959   3 Sheets-Sheet 1
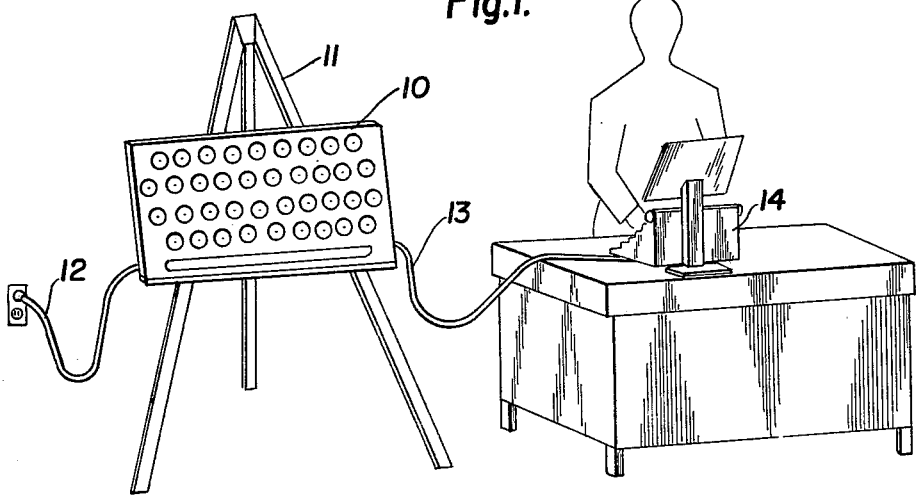
Fig.1.
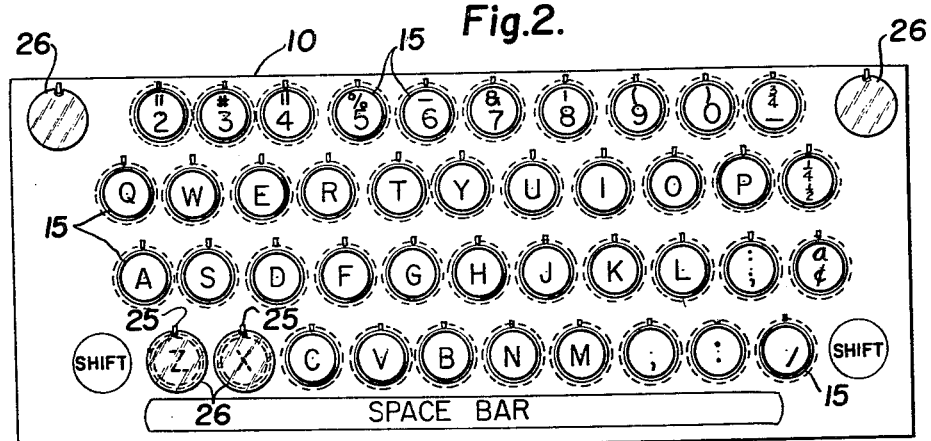
Fig.2.
Fig.3.
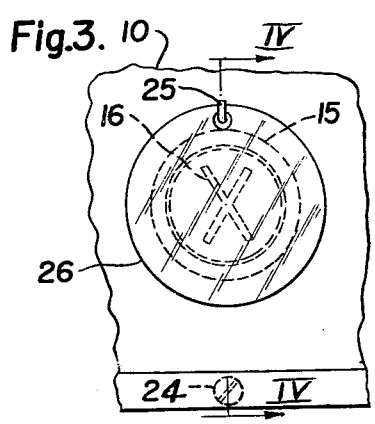
Fig.4.
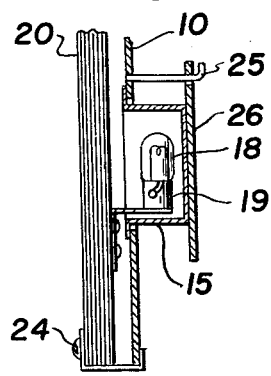
Fig.5.
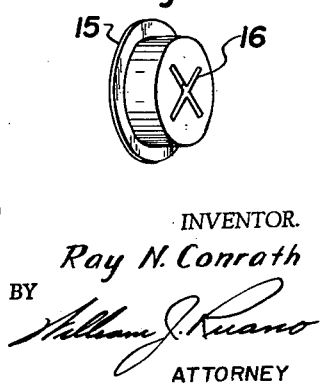
INVENTOR.
Ray N. Conrath
BY
ATTORNEY March 12, 1963  R. N. CONRATH  3,080,661
TYPEWRITER VISUAL AID SYSTEM
Filed Dec. 30, 1959  3 Sheets-Sheet 2
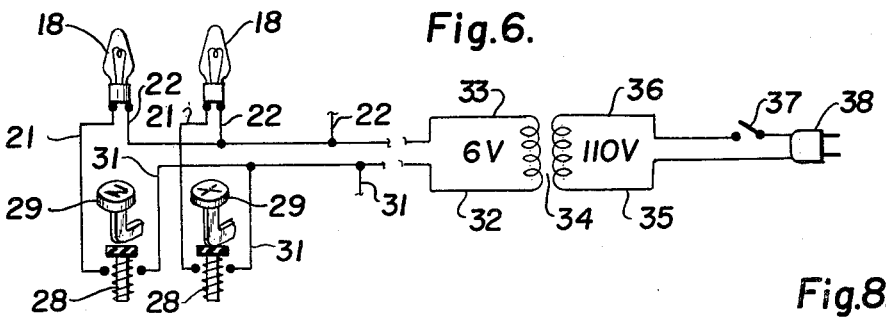
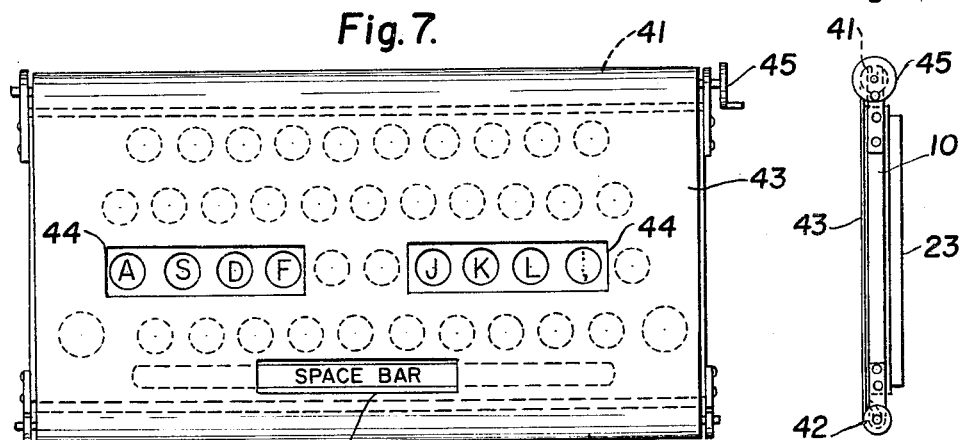
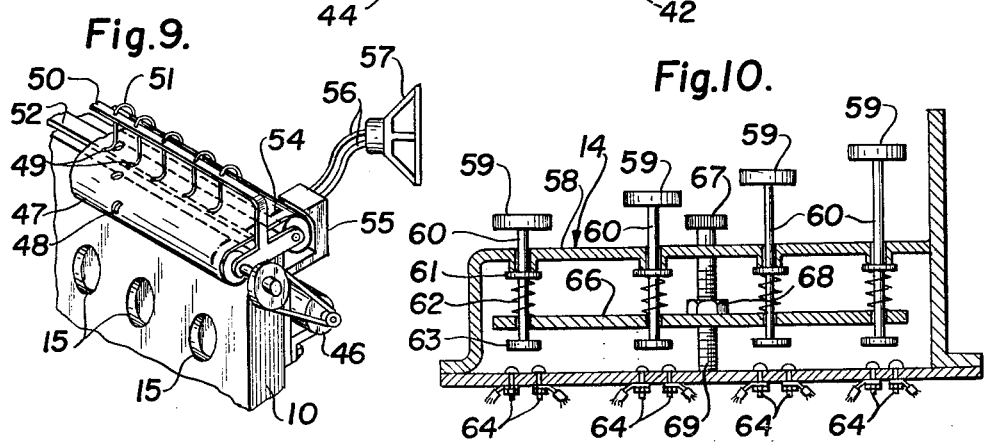
INVENTOR.
Ray N. Conrath
BY
ATTORNEY March 12, 1963 R. N. CONRATH 3,080,661
TYPEWRITER VISUAL AID SYSTEM
Filed Dec. 30, 1959 3 Sheets-Sheet 3

INVENTOR.
Ray N. Conrath
BY
*William J. Ruano*
ATTORNEY

United States Patent Office 3,080,661
Patented Mar. 12, 1963

3,080,661
TYPEWRITER VISUAL AID SYSTEM
Ray N. Conrath, 1672 Phila St., Indiana, Pa.
Filed Dec. 30, 1959, Ser. No. 862,964
2 Claims. (Cl. 35—6)

This invention relates to a typewriter audio visual aid system and, more particularly, to a typewriter instruction system whereby instructions from the teacher are given visually by controlling illumination sequence on a typewriter chart so as to greatly reduce the time required to teach typewriting.

An outstanding disadvantage of conventional methods of teaching the typewriter keyboard, such as by oral instruction of the teacher as to which keys to depress, or by reading such instructions from a book, the student must pause each time he hears the instructions or sees the instructions to translate them into the positions of the letters on the keyboard to be depressed. Also since the student is looking down at the typewriter at all times, or in that general vicinity, he has a great tendency to watch his finger movements, therefore will have great difficulty in developing the "touch" system (typewriting without looking at the keyboard) which is the most desirable system of typewriting.

An object of the present invention is to provide a novel typewriter audio visual instruction system which is devoid of the above named disadvantages of conventional systems and which will greatly reduce the time for training a student to become acquainted with the typewriter keyboard or to develop the "touch" system.

A more specific object of my invention is to provide a typewriter audio visual aid system including an enlarged keyboard chart in which the letters are selectively and sequentially illuminated under the control of the instructor to serve as means for audio visually instructing students as to which letters to depress, thereby more effectively associating particular letters with their location on the keyboard in the minds of the students and requiring students at all times to look away from their typewriters or hands, thereby greater facility in learning of the "touch" system.

Another object of the present invention is to provide a visual aid typewriting system which is so devised that the various letters of the keyboard may be learned in groups, so as to develop step-by-step learning, and which may include, in some instances an electrical system having a predetermined sequence of illumination of the various letters so as to free the instructor to give individual instruction to students while the visual aid system is operating in a completely automatic manner.

Other objects and advantages of the present invention will become more apparent from a study of the following description taken with the accompanying drawings wherein:

FIG. 1 is a perspective view showing, somewhat schematically, a typewriter visual aid system embodying the principles of the present invention;

FIG. 2 is a plan view of the large, illuminated typewriter keyboard chart shown in FIG. 1;

FIG. 3 is an enlarged, fragmentary view of one of the keys on the chart illustrated in FIG. 2;

FIG. 4 is a vertical, cross-sectional view taken along line IV—IV of FIG. 3;

FIG. 5 is a perspective view of the key representing the letter X, shown in FIGS. 3 and 4;

FIG. 6 is a schematic electrical diagram showing the circuit for illuminating the various lights in the system of FIGS. 1 and 2;

FIGS. 7 and 8 are plan and side views, respectively, of a modification embodying a roller having perforations and for blanking all keys on the typewriter except those exposed through the perforations so as to permit sequential learning of groups of keys, such as the home keys illustrated;

FIG. 9 is a perspective view showing another modification wherein a prearranged sequence of letters may be automatically played in accordance with a preselected pattern on a roll, much the same as on a player piano roll, and wherein oral announcements of the letters visually indicated may be simultaneously produced;

FIG. 10 is an enlarged, cross-sectional view showing the internal construction of the control unit 14 illustrated in FIG. 1 representing the instructor's keyboard which simulates that of a typewriter;

Figure 11:
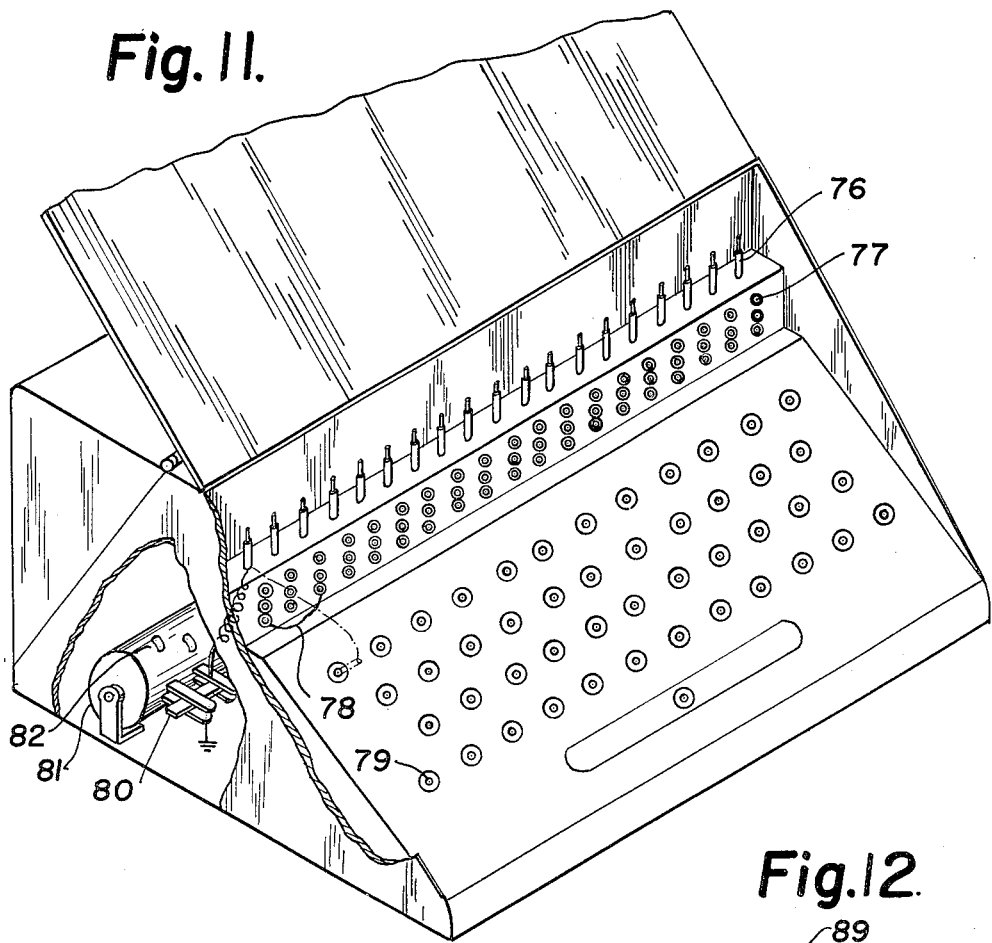
FIG. 11 is a perspective view of a modified form of the instructor's control board.

Referring more particularly to FIG. 1 of the drawings, numeral 10 denotes a large board which is representative of a typewriter keyboard, showing the various letters in the exact arrangement as on a typewriter keyboard, which board 10 is supported on an easel or tripod 11. Each of the letters on board 10 is preferably illuminated by a small lamp, such as 18 in FIG. 4, and the various lamps are energized by means of a main electric cord 12 plugged into an ordinary 110 volt A.C. electrical outlet. Various lamps, which will be described more fully hereinafter, are sequentially illuminated and controlled by means of control unit 14, operated by the instructor, connected by lead-in cable 13 to the lamps behind chart 10 so that as the various keys on control unit 14 are depressed, the particular lamps represented thereby on chart 10 are sequentially illuminated.

Referring more particularly to FIG. 2 which illustrates the board 10 of FIG. 1, mounted on baseboard 20 by fastener 24 (see FIG. 4), there is shown a plurality of letters, designating the various keys, which may be either painted directly on flat board, such as a cardboard or plastic board, or, preferably as shown, inscribed in cuplike elements, such as 15, illustrated in FIGS. 3, 4 and 5 which bear cut-out portions, such as 16, indicating the letter "X" which cut-out portions may be covered or filled with translucent plastic material, preferably of light color. Thus, for example, as lamp 18 associated with the particular letter "X" is illuminated energization of the terminals 21 and 22, the translucent outline of the letter "X" is observed by the students. In some instances it may be desirable to blank out the particular letter "X" in which case a blanking shield, such as 26, having a hole at the top thereof, is hung on a little hook 25 placed above each letter. Cap 15 may have black (opaque) sides with a translucent face with black letters and color coded for finger designation in use.

FIG. 6 shows the basic electrical diagram for illuminating the board 10, wherein plug 38, when energized, conducts electrical current through the primary of a 110 volt transformer through leads 35 and 36 when the main switch 37 is closed, thereby energizing a six volt secondary and lead lines 32 and 33, across which are connected the various lamps such as 18, through individual switches, such as those associated with actual keys, such as 29, on a regular typewriter. Thus, for example, when the "X" key 29 is depressed, compressing spring 28 on the typewriter, a circuit is completed through the associated lamp 18. Likewise, when the "n" key 29 of the typewriter is depressed its circuit will be completed to energize the associated lamp 18. Springs 28 are the ordinary return springs of a mechanical typewriter.

FIG. 7 shows another modification for selectively blanking the various keys, such as all keys other than the home keys, in the form of a paper roll 43 which is trained about a pair of rollers 41 and 42 by turning a crank handle 45, so that one section of the roll, as illustrated, will blank all keys except the home keys and space bar which may be observed through openings 44. The various lamps are located within the casing 23. Upon turning the crank 45, another section of the roll 43 will confront the keyboard so as to perhaps blank all except the reach keys, or any other selected group of keys. Or instead of providing a roll, there may be many individual, large cut-out blanking sheets, one sheet having the pattern illustrated in FIG. 7, exposing solely the home keys, and perhaps a second sheet exposing other groups of keys, such as certain reach keys in a particular row.

FIG. 9 shows an automatic system wherein the pattern for illuminating various letters on board 10 is preselected. In this case, roll 47, which is driven by motor 46, has perforated holes such as 48, like a player piano roll, so as to expose certain letters in a predetermined sequence. As portions of the perforated roll pass the commutator bar 52 containing aligned stationary contacts, fingers or feelers 49 forming electrical contact elements, will contact the corresponding stationary contacts so as to complete separate circuits to the various lamps. Upon completion of such circuit an additional circuit may be energized for initiating the playing of a recording of the sound of the particular letter, which circuit may be of any conventional play-back circuit, such as widely used in office dictating machines, contained in unit 55 for energizing wires 56 leading to a loud speaker 57. Of course, if the instructor should decide to personally announce the letters to the class he may do so, instead, either with or without a loud speaker.

FIG. 10 shows the inside construction and adjustable mounting in the unit 14, shown in FIG. 1. Instead of having various contacts for illuminating the associated lamps completed by the actual typewriter keys, such as 29 in FIG. 6, which, of course, necessitates mounting a switch on each key so that upon depressing the key the switch may be closed to complete a circuit to a lamp, a separate unit, such as shown in FIG. 1, namely, 14 may be used to merely simulate the actual keys of a typewriter. Such unit is shown in FIG. 10 and comprises a casing 58 on which is mounted a plurality of keys, such as 59, arranged in rows and being lettered in exact accordance with the keyboard of a typewriter. The various keys are provided with stems 60 and are normally urged upwardly by means of helical springs, such as 62, which urge stop elements 61 against collared portions of casing 58. The lower contact elements 63 are adapted to bridge stationary contact elements 64. Thus, when a particular key is depressed, this will complete the circuit to one of the lamps on the board 10, shown in FIG. 2. Means are provided for adjusting the tension of the various springs simultaneously so as to give the control element 14 the feel of an actual typewriter. In instances when an electric typewriter is to be simulated, less return spring tension is desired, whereas if a mechanical typewriter is to be simulated, greater return spring tension is desired. The tension of the springs may be adjusted simply by turning the threaded adjusting member 67 having threads 69 screw threadedly engaged to a vertical adjustable bar 66 which bar acts as a support for one end of the various springs. A particular adjustment is held by turning nut 68. Thus by rotating the threaded member so as to raise bar 66, the springs will be under greater compression therefore will more strongly resist the depression of the various keys.

Figure 12:
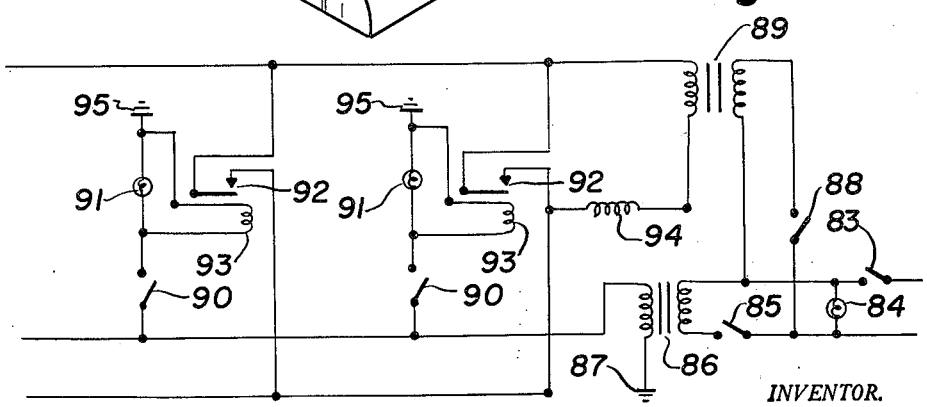
FIG. 12 is an electrical circuit diagram of the control board shown in FIG. 11.

FIG. 12 is a circuit diagram of a modified electrical control system for the demonstrator or control unit and which includes an on-off or all circuit switch 83 for energizing or deenergizing 110 volt supply conductors and a pilot switch 84 to indicate whether energized. Switch 85 controls the lamp circuit only and upon closing thereof the 6 volt transformer 86 for the lamp circuit is energized. A common ground 87 is provided.

Switch 88 controls the sound circuit and upon closing thereof the 6 volt, sound circuit transformer 89 is energized.

Switch 90 is on the keyboard and is operated by the instructor, lamp 91 being illuminated by closing thereof to illuminate the individual letters on the demonstration board. Switch 92 is operated to energize solenoid 94 for actuating a sound producing signal from any conventional sounding device (not shown) to simulate the tapping of typewriter keys, so as to develop rhythm.

FIG. 11 shows the instructor's control board which may be in the form of a cabinet with a hinged cover for protection when not in use. Banana plugs 76 are provided as well as phono pin sockets 77 for jumpers such as wire jumper 78. Banana plug sockets 79 are provided on the keyboard.

On activating roller 81 which is power driven, a plurality of switch activating pins 82 are provided for predetermining the actuating sequence of a plurality of stationarily mounted leaf switches 80.

Plugs 76 are used to complete the circuit to indicator lamps 91 through the rotary contact assembly 80, 81 and 82 and the appropriate key jacks 79. In operation, these plugs are plugged into jacks 79 to program specific sequences. Although nineteen rows are shown, any number desired could be used. Jacks 77 are used for selecting repeat sequences. They are wired to associated plugs 76 through a common bus bar. In operation, short patch cords 78 are used to interconnect jacks 77 so that short sequences may be repeated without long interruptions between repeated sequences. Without this row of jacks, it would be necessary for the unit to run through the entire cycle (nineteen characters for the machine illustrated in the drawings) before it could repeat the sequence. With this device, it would be possible to type short combinations (like "fj") continuously and indefinitely without pauses.

Jumper wires 78 are used as mentioned above. It is necessary to use them only when the sequence is shorter than the number of jacks 77 that are available for programing.

Jacks 79 are wired directly to the multi-contact plug which, in turn, is wired to the individual indicator lamps 91. These jacks are placed in the fashion of the typewriter keyboard so that selection of sequence to be repeated is quick and easy.

Switch assembly 80 is tripped in sequence by a revolving drum 81 upon which appendages 82 are spaced to coincide with the switch spacing. Switches are SPST leaf type and are mounted on a common dielectric to reduce cost and facilitate assembly.

Revolving drum 81 has spiral appendages 82 at regularly spaced intervals. The drum is powered by a variable speed motor. The appendages trip the switches 80 in sequence, once each revolution of the drum. Speed of the revolutions, therefore, controls the speed of the flashing of the indicator lights 91.

*Operation of Automatic Seeboard Control Unit*

Automatic operation of the system is effected by removing the manual control head plug and substituting the plug attached to the automatic control unit. The automatic control unit is simply a series of SPST switches arranged in a manner so that they may be "triggered" by appendages fastened to a rotating cylinder. The cylinder is motor driven and its speed can be varied over a fairly wide range.

The automatic sequence is programed by inserting plug $76_1$ hereinafter subscripts 1, 2, etc. will indicate the particular plug or jack numbered from left to right) into the appropriate jack 79 representing the first letter desired. Plug $76_2$ is then inserted into jack 79 that represents the second letter of the desired sequence. This procedure is duplicated until the desired number of "letters" are programed. The length of the sequence is limited only by the number of plugs 76 provided on the console. It is most probable, however, that the series will be a short one such as "j, u, j, space." Jacks 77 and jumpers 78 allow the use of such short sequences without waiting for the automatic cycle to run through its entirety (i.e., through one revolution of the motorized drum).

In the case of short sequences, the first time the letter is used, it is programed by plugging the appropriate plug 76 into its respective letter jack 79. When this letter is next needed, it is necessary to run a jumper wire from the jack 77 (under plug 76) where the letter was first programed, to jack 77 under the position where the letter should next appear. For example, let us assume that we wish to program the series "j, u, j, space." The followings steps should be followed:

Insert plug $76_1$ into jack 79 which corresponds to the location of letter "j" on the standard typewriter keyboard.

Insert plug $76_2$ into jack 79 which corresponds to the location of the letter "u" on the standard typewriter keyboard.

Insert one end of a short jumper wire 78 into jack $77_1$ (the position where the letter "j" was used for the first time). Insert the other end of the jumper wire 78 into jack $77_3$.

Insert plug $76_4$ into jack 79 which corresponds to the location of the space bar on the standard typewriter keyboard.

Insert one end of short jumper wire 78 into jack $77_3$ (the position where the letter "j" was used the second time). Insert the other end of the short jumper wire 78 into jack $77_5$.

Insert one end of a short jumper wire 78 into jack $77_2$ (the position where the letter "u" was last used). Insert the other end of jumper 78 into jack $77_6$.

Insert one end of short jumper wire 78 into jack $77_5$ (the position where the letter "j" was last used). Insert the other end of the pumper wire into jack $77_7$.

Insert one end of the short jumper wire 78 into jack $77_4$ (the position where "space" was first used). Insert the other end of the jumper wire into jack $77_8$.

Continue in this manner until all of the jacks have been programed.

The tops of the keys of the demonstrator control unit 14 may have a tactile surface, coated with flocking of wool, rayon or other flocking materials, or the keys may be covered with caps which have flocked surfaces or which have removable discs which are flocked (preferably on both sides, due to wearability, since they may be turned over so as to use both flocked surfaces). The purpose of the flocking is to control the lighter touch as is required for the shorter stroke and more sensitive switches of the electric typewriter fleyboards. The fingers will be more sensitive to the light touch and the keys will not be tripped because of the lack of sufficient sensitivity to pressure on the key tops. The flocked key surface will permit the transfer of learning from the manual typewriter to the electric typewriter in less time since there will be no similarity of the smooth surfaced keys (which require power stroking) to the velvet-like or flocked surfaces on the electric typewriters.

Thus it will be seen that I have provided an efficient typewriter keyboard visual and audio aid system which will more quickly teach the student the arrangement of the letters on a typewriter keyboard, also which will more quickly teach the student the "touch system" since the reaction time for translating oral instruction into the visual positioning of the various keys on the keyboard is eliminated, and since the actual normal reaction that accompanies ordinary typewriting is more closely simulated; furthermore I have provided a completely automatic typewriting visual instruction system which frees the teacher from the task of instruction to enable the teacher to give individual attention to students who are watching the visual aid board.

While I have illustrated and described several embodiments of my invention, it will be understood that these are by way of illustration only, and that various changes and modifications may be made within the contemplation of my invention and within the scope of the following claims.

I claim:

1. A typewriter visual aid board comprising a large board having a representation of a typewriter keyboard inscribed thereon, an electric lamp located behind each letter of the keyboard, control means simulating a typewriter keyboard, electric circuit means operated by said control means for selectively completing circuits through the various letters on said visual aid board in accordance with the keys depressed on said control means, whereby an illuminated visual indication of certain letters on said board is made simultaneously with the depression of the corresponding key on said control means, and a plurality of sheets of blanking paper, each containing perforations for exposing only certain groups of letters on said board, said board being selectively covered with different ones of said sheets so as to expose successively different groups of letters on said board.

2. A typewriter visual aid board comprising a large board having a representation of a typewriter keyboard inscribed thereon, an electric lamp located behind each letter of the keyboard, control means simulating a typewriter keyboard, electric circuit means operated by said control means for selectively completing circuits through the various letters on said visual aid board in accordance with the keys depressed on said control means, whereby an illuminated visual indication of certain letters on said board is made simultaneously with the depression of the corresponding key on said control means and a sheet of blanking paper containing perforations for exposing only certain groups of letters on said board, and means including a pair of rollers and a crank for moving said perforated sheet so as to selectively expose different perforated hole arrangements on said board.

References Cited in the file of this patent

UNITED STATES PATENTS

| | | |
|---|---|---|
| 710,264 | Gibbs | Sept. 30, 1902 |
| 1,021,153 | Kurowski | Mar. 26, 1912 |
| 1,560,020 | Curley | Nov. 3, 1925 |
| 2,115,920 | Smith | May 3, 1938 |
| 2,154,478 | Smith | Apr. 18, 1939 |
| 2,348,744 | McMurry | May 16, 1944 |
| 2,435,149 | Mitchell | Jan. 27, 1948 |
| 2,500,507 | Avery et al. | Mar. 14, 1950 |
| 2,855,703 | Stanton | Oct. 14, 1958 |

FOREIGN PATENTS

| | | |
|---|---|---|
| 762,367 | Great Britain | Nov. 28, 1956 |
| 824,031 | France | Nov. 3, 1937 |